Dec. 1, 1959  T. R. SMITH  2,915,120
TIME CONTROL FOR AUTOMATIC WASHERS
Filed March 15, 1954  3 Sheets-Sheet 1

Inventor
Thomas R. Smith
by Wilkinson, Huxley, Byron & Hume
Attorneys

Dec. 1, 1959 T. R. SMITH 2,915,120
TIME CONTROL FOR AUTOMATIC WASHERS
Filed March 15, 1954 3 Sheets-Sheet 2
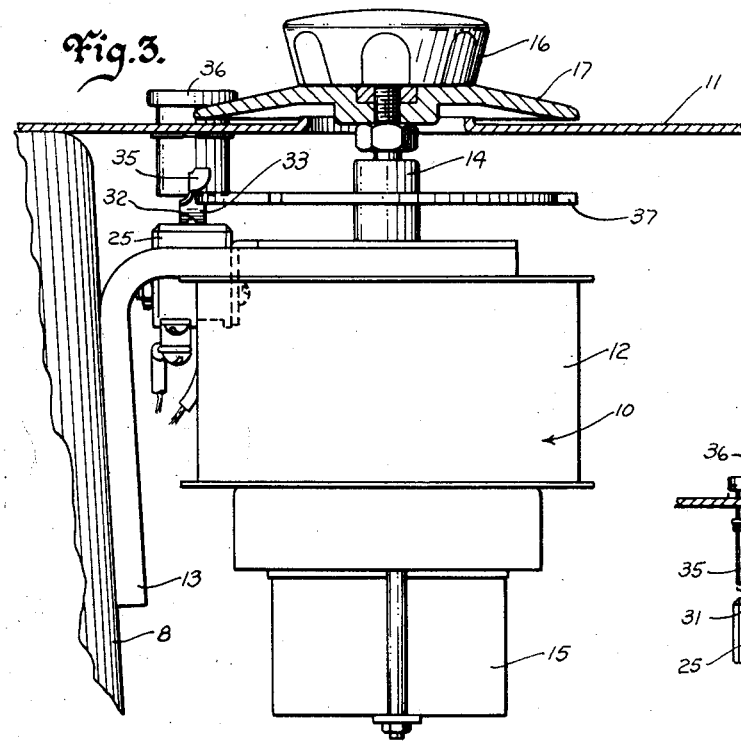
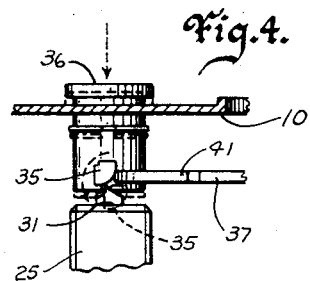
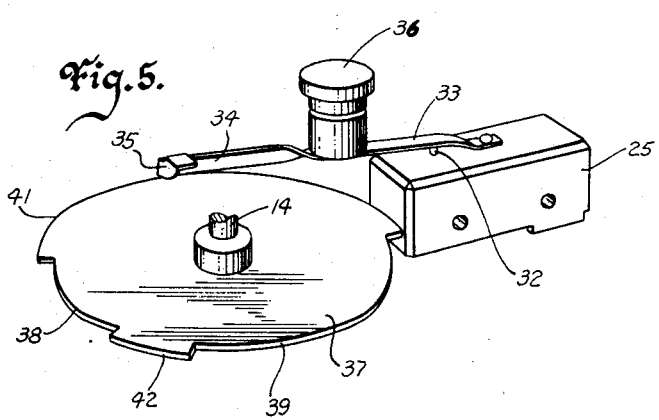
Inventor
Thomas R. Smith
by Wilkinson Huxley Byrn & Hume
Attorneys

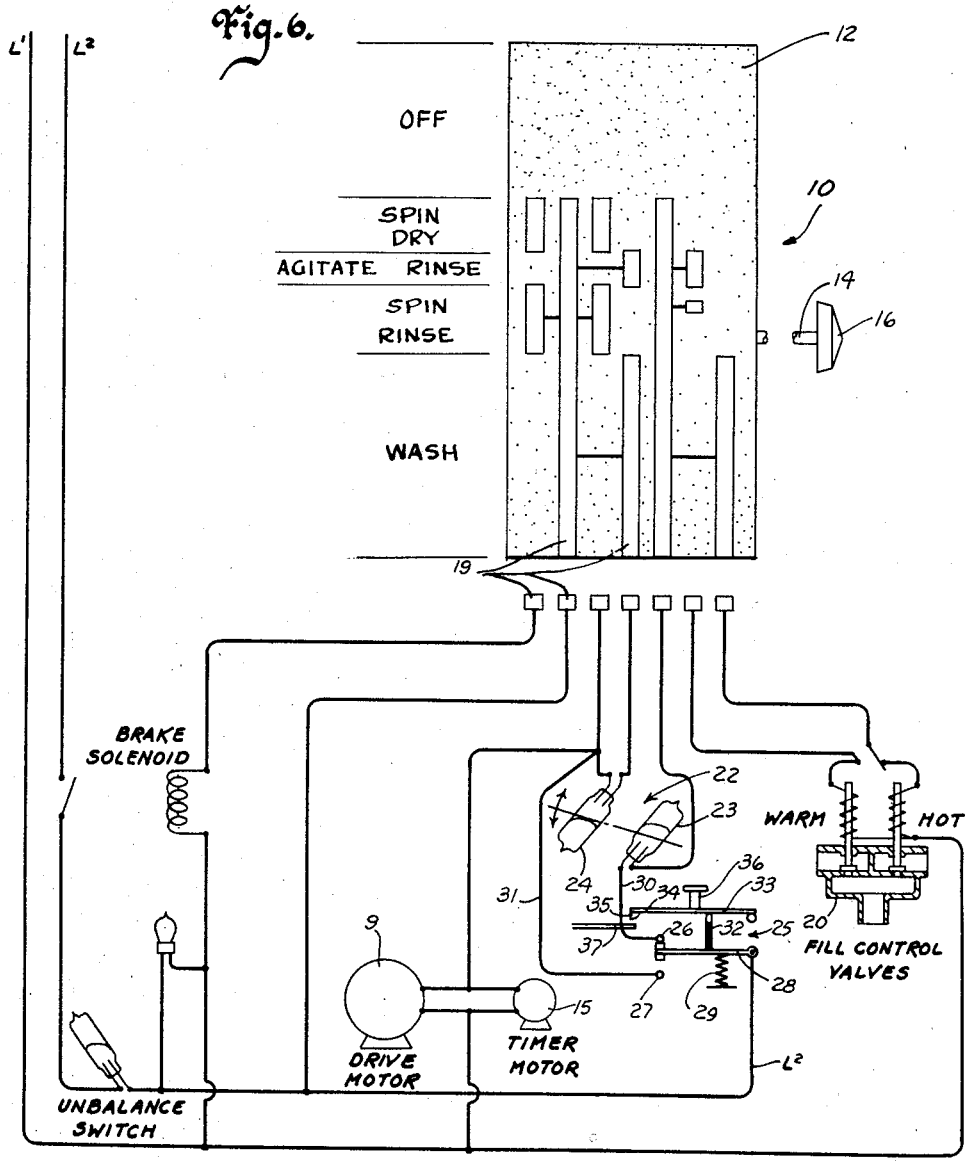

United States Patent Office 2,915,120
Patented Dec. 1, 1959

2,915,120

TIME CONTROL FOR AUTOMATIC WASHERS

Thomas R. Smith, Newton, Iowa, assignor to The Maytag Company, Newton, Iowa, a corporation of Delaware Application March 15, 1954, Serial No. 416,124

3 Claims. (Cl. 161—1)

The invention relates to a control for a washing machine, and more particularly to a control which provides a simplified means for selectively initiating the washing operation at any desired liquid level within the washing machine.

Heretofore, in vertical axis type washing machines having automatic or semi-automatic control features, it has been difficult selectively to vary the level of the washing liquid within the tub efficiently to wash less than normal amounts of clothing. In most instances, the normal quantity of washing liquid and detergent is required because the control means would not be effective to initiate the washing operation until the liquid level in the tub, or adjacent level responsive container, reaches some predetermined maximum level. While various means have been suggested to initiate the washing operation, these means usually require certain conditions to be met which do not give the operator the flexibility sometimes necessary effectively to wash the clothes. For example, in one arrangement, where the washing and rinsing cycles are under the control of an automatic timer, if it is desired to wash a small amount of clothing in less than the normal quantity of water, this may be accomplished by washing only for a relatively short interval of time. It has heretofore not been possible to wash with less than normal liquid levels for normal, or nearly normal, intervals of time.

In the improved control arrangement of the present invention, the operation of the washing machine may be initiated at any liquid level, and for any length of time, within the normal washing limits designed into the timer. Briefly, the control arrangement includes a standard type automatic cycling control which is operative, after manually setting and conditioning the circuit for operation, automatically to operate the washing machine in a predetermined sequence of steps for washing, rinsing and liquid extraction. This control arrangement includes a float operated switch means which is operative, when the liquid level reaches a predetermined high level, to interrupt the flow of water to the tub, to initiate the agitation portion of the cycle, and to start the operation of the timer motor to cause operation of the washing machine through the sequence of predetermined steps. Associated with the control is a cam disk that is engageable by a switch lever which, in turn, is operatively connected to a shunting switch electrically connected with the float operated switch. When the lever and cam are manually moved into engagement, the shunting switch supersedes the float operated switch to cause operation of the washing machine in a manner identical to that as if the float switch were actuated. In this manner the operator may personally observe and select the liquid level for washing less than normal quantities of clothes, and then manually actuate the shunting switch to initiate the washing operation for any time interval within the design limits of the timer, and, thereafter, the remaining portion of the automatic cycle will be continued under the control of the timer.

It is, therefore, one of the objects of the invention to provide a control for a washing machine which is provided with a shunting switch to short circuit the normal liquid level responsive switch selectively to initiate the washing operation at any desired liquid level below the normal level for any purpose, such as, to wash less than normal amounts of fabrics.

It is another object of the invention to provide a control for a washing machine for initiating the washing or rinsing operation in an automatic cycle for any selected time interval with less than the normal quantity of water.

It is still another object of the invention to provide an automatic control assembly for washing machines with a cam means for cooperation with a shunting switch which is selectively and manually actuated to initiate the washing or rinsing operation at less than the normal level of liquid for such operation.

It is yet another object of the invention to provide an automatic cycle control for a washing machine having a shuting switch selectively to initiate the washing operation independently of the regular automatic controls, said switch being actuated at the end of each period to restore the regular automatic controls to their normal function for controlling the next operating cycle.

These and other objects, features, capabilities and advantages of the invention, will be better understood by reference to the following specification, considered in conjunction with the accompanying drawings, in which:

Figure 3 is an enlarged vertical partial sectional view of the cycle control assembly taken on the line 3—3 of Figure 2;

Figure 4 is an enlarged fragmentary elevational view of the switch operating button and the spring latch, showing the position of the latch when the button is partially depressed in solid lines, and illustrating its position when completely depressed in broken lines;

Figure 5 is an enlarged prospective view of the cam, switch and spring latch to illustrate more clearly their relative positions; and Figure 6 is a wiring diagram of a control circuit for an automatic washing machine incorporating the improved control means.

Figure 1:
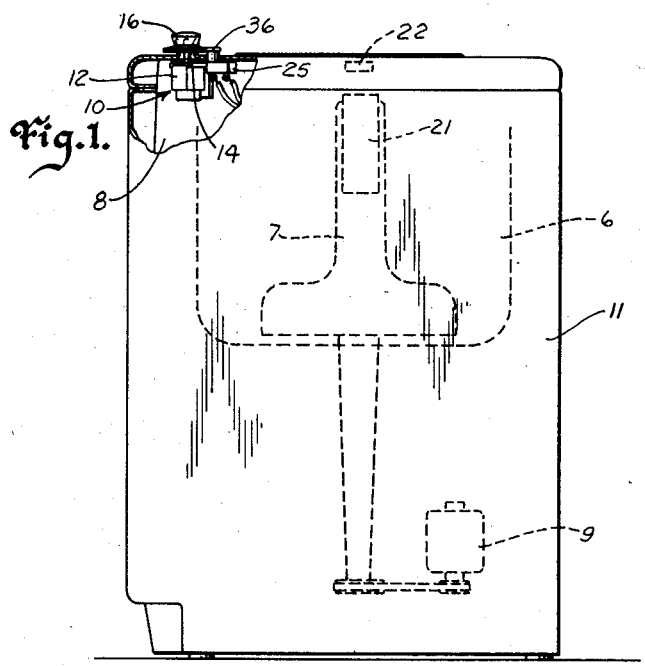
Figure 1 is a side elevational view of an automatic washing machine with a portion of the machine broken away to show the location of the improved control.

Referring now in greater particular to the drawings for an embodiment of the invention, there is shown in Figure 1 a washing machine of the vertical axis type which includes a rotatable tub 6 in which is mounted an oscillatable agitator 7 to effect the washing operation. The rotatable tub 6 and agitator 7 are mounted within a stationary casing or tub 8, and are selectively rotated and oscillated, respectively, through suitable connections by means of a drive motor 9 which in turn is under the control of a control assembly 10. Surrounding all the elements is a casing or cabinet 11 which is provided with a lid or cover in its top wall to permit access to the inner rotatable tub 6.

Figure 2:
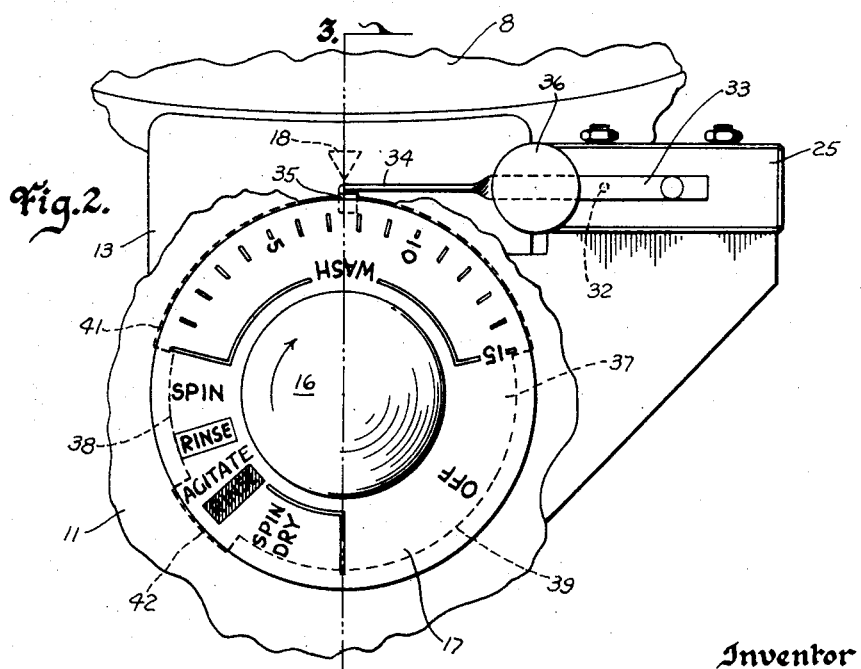
Figure 2 is an enlarged plan view of the timer or cycling control with the improved control applied thereto.

Secured to the outer face of the side wall of the stationary tub 8 by means of a bracket 13 (Figs. 2 and 3) is a sequential circuit controller 12, which is rotated in one direction by means of a timer motor 15. This controller is disposed beneath the top wall of the cabinet and includes a vertical upwardly directed rotatable shaft 14 projecting through an opening in the top wall. The upper end of the shaft 14 is provided with a control knob 16, having suitable indicia thereon, that is adapted to be grasped by the operator and manually turned in a clockwise direction to any selected position of the several positions indicated. By referring to Figure 2, it can be seen that the upper surface of the control knob has a dial 17 which is divided into various labeled sectors to apprise the operator of the setting of the washing machine by reference to a datum point 18 established on the wall of the cabinet. As shown, the control knob has been turned from its "off" position to a point where the washing phase of the cycle will be of 7½ minutes duration. In this position, when the drive motor 9 is energized by either of two different means, hereinafter explained, the washing phase of the cycle runs for the selected time, and the remaining phases of the full cycle will be completed under the control of the controller 12. Of course, it is possible for the operator manually to modify the operating cycle at will through the automatic control merely by advancing the control knob to another position.

The controller 12 is provided with the requisite number of contacts 19 (Fig. 6), so that under normal automatic control conditions, when the operator manually turns the knob 16 in a clockwise direction from its "off" position to any portion of the washing phase, the mixing valve 20 is energized to admit liquid to the tub 6, and, at the same time, the timer and drive motors 15 and 9, respectively, are conditioned for operation. Water is admitted to the tub until such time as a float 21 (Fig. 1) responding to the liquid level therein, actuates the switch 22 (Figs. 1 and 6), which deenergizes the water inlet valve 20 by rocking the water control switch 23. At the same time, the switch 24 is tilted, which simultaneously energizes the drive and timer motors 9 and 15, respectively. The drive motor operates the agitator to effect the washing operation, while the timer motor advances the controller 12 at a predetermined rate toward the next phase of the operating cycle. These and other features in the automatic control are more or less standard practice, an automatic control of the type briefly described above having been fully described in Thomas R. Smith Patent No. 2,635,446, dated April 21, 1953, assigned to the assignee of the present invention.

Mounted adjacent to the controller 12 is a shunting double throw switch 25 electrically connected in the circuits of the float operated switches 23 and 24, respectively. This double throw switch includes a pair of alternately "on" and "off" contacts 26 and 27 and a movable contact 28 connected to the line $L_2$. The movable contact 28 is normally held in engagement with the contact 26 by means of a spring 29. The contact 26 is connected in series with the water inlet switch 23, and the contact 27, which is normally open, is connected to a lead 31 in parallel with—and in bypassing relation to—the motor switch 24. While the contacts in the switch are normally biased in a direction to maintain the contact 26 closed and the switch 27 open by means of the spring 29, the movable contact 28 is readily movable by means of a contact pin 32 to the opposite position wherein the contact 26 is open and the contact 27 closed. The pin 32 is actuated by a lever arm 33 having one end pivoted to the switch housing and an outer movable free end 34 which includes an enlargement providing a cam latch 35. The lever arm 33 is capable of slight lateral resilient displacement in addition to its pivotal movement, and is disposed beneath a manually operated push button 36 which also projects upwardly through the top wall of the cabinet adjacent to the control knob 16.

Secured to the upwardly projecting vertical shaft 14 of the timer assembly and rotatable therewith is a notched circular cam disk 37. This disk is relieved at two spaced sectors 38 and 39 around its periphery to provide latch release zones between the cam sectors 41 and 42 of greater radial dimension. By referring to Figure 2, it can be seen that the relieved sectors 38 and 39, respectively, are coincident with the "spin rinse," "spin dry" and "off" positions on the dial 17, while the unrelieved cam sectors 41 and 42, respectively, lie for the most part beneath the "wash" and agitate rinse portions of the dial, as will be explained hereinafter. The cam sectors 41 and 42 overlie the cam latch 35 to hold it down after the button 36 has been actuated to depress the lever 33 below the disk 37. The relieved sectors 38 and 39, being of shorter radial dimension than the cam sectors, release the latch 35 when the rotating controller moves the cam sectors beyond it.

Under normal operating conditions, with normal quantities of clothing, the shunting switch 25 performs no useful function, and the operation is fully automatic as soon as the operator sets the control knob for the selected washing period.

When less than normal amounts of clothing are to be washed, the operator follows the same procedure as for the normal operation by setting the control knob 16 to any desired washing time. This action energizes the valve 20 to supply water to the tub in the usual manner. When the desired liquid level is reached by observation, the operator depresses the button 36 adjacent the control knob for the full travel.

As more clearly appears in Figures 2 to 5, the push button 36, when depressed by the operator, forces the switch lever arm 33 downwardly. This action moves the cam latch 35 into engagement with the outer edge of the disk 37 at the sector 41 and, by virtue of the contoured edge of the latch, continued downward movement causes the lever arm to move laterally until its free end 34 attains a position where the latch 35 snaps beneath the edge of the disk, where it is held in its depressed position by the overlapping cam sector 41. This same downward movement of the lever 33 moves the switch operating pin 32 downwardly to bypass the electric motor control switch 24 through the contacts 27 and 28 and conductor 31 to initiate the washing operation for the time limit selected by the operator. This also energizes the timer motor 15 to rotate the controller 12 and the disk 37 carried thereby. At the same time, the contacts 26 and 28 in series with the water control switch 23 are opened to interrupt the flow of water to the tub. Thus, the operation of the washing machine is initiated regardless of the demands of the float control switch 22 because the control effect of both switches 23 and 24 has been removed from the circuit for the time being. At the end of the selected washing period, as the latch 35 reaches the relieved sector 38 in the disk, the latch is released, and it snaps upwardly to its normal "off" position, whereby the control of the washing cycle is returned to the controller 12 automatically to continue the operation in the standard manner.

Under ordinary conditions, it is during the washing phase of the cycle that less than normal amounts of water may be desirable in view of the savings in hot water and detergent that can thus be effected. However, after the extraction operation and during the filling period prior to the agitate-rinse phase of the cycle, the operator, upon observing the desired liquid level, may elect again to depress the button 36 to move the latch 35 beneath the sector 42 to initiate the agitate-rinse operation with less than a normal quantity of water. If the control button is thus depressed, the agitation and rinse phase of the cycle is immediately started, after which the shunting switch 25 is again released during the final extraction or drying operation to return the control to the automatic controller 12.

For the purposes of this description, when the switch 25 is referred to as "off," its position is such that contact 26 in series with valve switch 23 is closed, while contact 27 in parallel with the motor switch 24 is open. When referred to as "on," the contact 26 is open to render the switch 23 inactive, while the contact 27 is closed to shunt the motor switch 24.

In an arrangement of this type, the prime advantage to its use is that the operator may wash less than normal amounts of clothing in less than the normal quantities of water required to initiate the automatic washing operation, and can set the washing period for any duration in the washing phase within the limits of the controller. This arrangement also permits the operator to set the limit of the washing operation for normal quantities and levels of water without causing overlapping or resetting after the filling operation of the cycle is completed.

Another feature is that at the end of each cycle of operation, where less than normal quantities of water are used, the control automatically reverts to the automatic control portion of the controller. Thus, the danger of starting the next operation, should a normal load of fabrics be used, with less than the required normal quantity of water, is obviated.

While I have described and shown a preferred embodiment of the invention for purposes of illustration, it is not limited thereto, since obvious changes may be made without departing from the spirit of the invention in accordance with the appended claims.

I claim:

1. The combination comprising a rotatable disc member, means for rotating said disc member, a resiliently biased latch arm, said latch arm having a cam and latch portion for camming said latch arm past said disc member when depressed and maintaining a latching relationship therewith, manual means for depressing said latch arm, a switch having a movable contact for movements to first and second positions, spring means biasing said movable contact of the switch to said first position, and a member mounted between said latch arm and said movable contact for moving and maintaining said movable contact of the switch to and in said second position when said latch arm is maintained depressed, said disc member having a recessed portion on its periphery for unlatching said latch arm and releasing said movable contact of the switch so as to permit the latter to return to said first position.

2. The combination comprising a timer, a rotatable disc member, means connected to said timer for rotating said disc member, circuit means including a switch for energizing said timer, a resiliently biased latch arm pivoted at one end adapted to be manually depressed into association with said disc member, said latch arm having a cam and latch portion at the opposite end for camming said latch arm past said disc member when depressed and maintaining a latching relationship therewith, a switch having a movable contact, spring means biasing said movable contact to a first position, and a member mounted between said latch arm and said movable contact for moving and maintaining said movable contact to and in a second position when said latch arm is depressed for energizing said timer, said disc member having a recessed portion on its periphery for unlatching said latch arm and permitting said movable contact of the switch to return to said first position.

3. The combination comprising a sequential circuit controller, a rotatable disc member, motor means for rotating said sequential circuit controller and said disc member, circuit means including a switch for energizing said motor means, a resiliently biased latch arm adapted to be manually depressed into association with said disc member, said latch arm having a cam and latch portion for camming said latch arm past said disc member when depressed and maintaining a latching relationship therewith, a switch having a movable contact, spring means biasing said movable contact to a first position, and a member mounted between said latch arm and said movable contact for moving and maintaining said movable contact to and in a second position when said latch arm is depressed for energizing said motor means, said disc member having a recessed portion on its periphery for unlatching said latch arm and permitting said movable contact of the switch to return to said first position.

References Cited in the file of this patent

UNITED STATES PATENTS

| | | |
|---|---|---|
| 758,084 | Little | Apr. 26, 1904 |
| 841,226 | Chappel | Jan. 15, 1907 |
| 1,177,279 | Schmid | Mar. 28, 1916 |
| 2,328,073 | Hanney | Aug. 31, 1943 |
| 2,421,481 | Collins | June 3, 1947 |
| 2,554,672 | Johnston | May 29, 1951 |
| 2,585,018 | Kreitchman | Feb. 12, 1952 |
| 2,635,445 | Smith | Apr. 21, 1953 |
| 2,662,384 | Morrison | Dec. 15, 1953 |

UNITED STATES PATENT OFFICE
CERTIFICATE OF CORRECTION

Patent No. 2,915,120                                             December 1, 1959

Thomas R. Smith

It is hereby certified that error appears in the printed specification of the above numbered patent requiring correction and that the said Letters Patent should read as corrected below.

Column 2, line 20, for "shuting" read — shunting —.

Signed and sealed this 17th day of May 1960.

(SEAL)
Attest:

KARL H. AXLINE
Attesting Officer

ROBERT C. WATSON
Commissioner of Patents